United States Patent
Castelain et al.

(10) Patent No.: US 7,756,210 B2
(45) Date of Patent: Jul. 13, 2010

(54) METHOD FOR TRANSMITTING OPTIMALLY DIVERSIFIED INFORMATION IN A MIMO TELECOMMUNICATION SYSTEM

(75) Inventors: Damien Castelain, Rennes Cedex 7 (FR); Loic Brunel, Rennes Cedex 7 (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 624 days.

(21) Appl. No.: 11/091,415

(22) Filed: Mar. 29, 2005

(65) Prior Publication Data

US 2005/0226313 A1    Oct. 13, 2005

(30) Foreign Application Priority Data

Apr. 8, 2004    (EP)    ................... 04290941

(51) Int. Cl.
H04L 1/02    (2006.01)
(52) U.S. Cl. ....................... 375/267; 455/101
(58) Field of Classification Search ................... 375/267
See application file for complete search history.

(56) References Cited

U.S. PATENT DOCUMENTS

| 6,873,606 | B2* | 3/2005 | Agrawal et al. ............. 370/310 |
| 2003/0063654 | A1 | 4/2003 | Onggosanusi et al. |
| 2003/0126536 | A1* | 7/2003 | Gollamudi et al. .......... 714/748 |
| 2003/0161412 | A1 | 8/2003 | Niida et al. |
| 2003/0235147 | A1 | 12/2003 | Walton et al. |
| 2004/0013180 | A1* | 1/2004 | Giannakis et al. ........... 375/219 |
| 2004/0033782 | A1 | 2/2004 | Horng et al. |
| 2004/0141548 | A1* | 7/2004 | Shattil ........................ 375/146 |
| 2005/0041750 | A1* | 2/2005 | Lau ............................. 375/267 |
| 2005/0078761 | A1* | 4/2005 | Hottinen et al. ............. 375/267 |
| 2005/0180369 | A1* | 8/2005 | Hansen et al. .............. 370/338 |

OTHER PUBLICATIONS

"Adaptive Modulation schemes for MIMO HSDPA", Javier R. Fonollosa et al., Jun. 2002; http://www.ist-imetra.org.
"Adaptive Modulation schemes for MIMO HSDPA" Jun. 2002, pp. 1-21, IST-2000-30148 I-METRA Project; http://www.ist-imetra.org.

\* cited by examiner

*Primary Examiner*—Shuwang Liu
*Assistant Examiner*—David Huang
(74) *Attorney, Agent, or Firm*—Oblon, Spivak, McClelland, Maier & Neustadt, L.L.P.

(57) ABSTRACT

A method for transmitting data in a telecommunication system including at least one transmitter including at least two transmitting antennas and at least one receiver including at least one receiving antenna. The method includes: transforming a plurality of bits of the data to be transmitted into a plurality of symbols by modulating the plurality of bits of the data at the transmitter; generating a first vector formed by the plurality of symbols at the transmitter; preparing a modified matrix by modifying an original matrix based on a number of rows of the first vector, the original matrix being predefined at the transmitter; generating a second vector by multiplying the first vector with the modified matrix at the transmitter; and transmitting symbols forming the second vector over communication channels established between the at least two transmitting antennas of the transmitter and the at least one receiving antenna of the receiver.

3 Claims, 6 Drawing Sheets

METHOD FOR TRANSMITTING OPTIMALLY DIVERSIFIED INFORMATION IN A MIMO TELECOMMUNICATION SYSTEM

CROSS-REFERENCE TO RELATED APPLICATIONS

The present application claims priority under 35 U.S.C. 119 to European Patent Application Serial No. 04 290941.6, which was filed in the European Patent Office on Apr. 8, 2004.

BACKGROUND

1. Field of Invention

The present invention relates to a method for transmitting data in a telecommunication system including at least one transmitter provided with at least two transmitting antennas and at least one receiver provided with at least one receiving antenna, which method includes a symbol encoding step for producing symbols to be transmitted over communication channels established between the transmitting and receiving antennas.

2. Description of Related Art

Telecommunication systems in which a plurality of antennas are used at a receiver end and/or at a transmitter end of a wireless link are called Multiple Input Multiple Output systems (further referred to as MIMO systems). MIMO systems have been shown to offer large transmission capacities compared to those offered by single antenna systems. In particular, MIMO capacity increases linearly with the number of transmitting or receiving antennas, whichever the smallest, for a given Signal-to-Noise Ratio and under favourable uncorrelated channel conditions. MIMO techniques are thus likely to be used in future wireless systems intended to provide large spectral efficiencies or, alternatively, reduce the transmitting power required for obtaining a spectral efficiency equivalent to that which is obtained in current telecommunication systems. Such MIMO techniques will very likely be combined with multi-carrier modulation techniques like OFDM (standing for Orthogonal Frequency Division Multiplex) and MC-CDMA (standing for MultiCarrier-Code Division Multiple Access) techniques, whose use in future wireless systems is also considered.

A particular type of MIMO systems makes use of a Bit Interleaved Coded Modulation technique, further referred to as BICM, according to which the transmitter includes a channel encoder intended to apply an encoding, e.g. by means of a convolutional code or of a turbo code, to uncoded data bits, and to provide a binary stream to an interleaver. This interleaver will then deliver permutated bits, which are to be divided into word sequences intended to be transformed into a series of coded symbols featuring each a plurality of real or complex components, the components of a same symbol being intended to be transmitted during a same time chip by respective transmitting antennas. It should be noted here that information corresponding to two different time chips may be transmitted at two different instants in time, but may also be transmitted at a same instant by two different carrying signals having suitable different frequencies, for example in the purpose of spreading said symbols in the spectral domain, as may be done in OFDM telecommunication systems.

Transmitted symbols are to be decoded on the receiver end, which may be performed in MIMO systems of the BICM type by means of an iterative space-time decoder, which decoder is intended to produce estimates of coded bits constituting the transmitted symbols. The spatial diversity induced by the use of multiple transmitting and receiving antennas eases such a decoding, since this diversity provides a larger amount of information than that which would be provided by a single signal transmitted through a single communication channel.

SUMMARY

The inventors have observed that increasing the diversity of input data perceived by a front-end detector included in a space-time decoder enables said decoder to converge more quickly towards reliable estimates of the coded bits on the basis of which said data has been generated. This may be construed as obtaining better decoding performance by feeding the decoder with data having a higher quality, i.e. a richer content.

The spatial diversity perceived by the receiving antennas, which is obtained by using multiple communication channels, though producing the above-mentioned advantages, is limited by the number of receiving antennas, which in turn limits the performance of the space-time decoder.

The inventors have also observed that, while the use of multiple transmitting and/or receiving antennas enables to transmit a larger amount of information, and thus to increase the throughput of the telecommunication system, said throughput should take into account adverse communication conditions affecting the communication channels established between any given transmitter and receiver. Such adverse conditions could cause transmitted data to be altered during its transmission in such a way that said data could not be safely retrieved by the receiver, in which case a certain degree of redundancy should preferably be introduced between the symbol encoding step and the actual transmission of the symbols.

In a first exemplary embodiment, there is a method for transmitting data in a telecommunication system including at least one transmitter including at least two transmitting antennas and at least one receiver including at least one receiving antenna. The method includes: transforming a plurality of bits of the data to be transmitted into a plurality of symbols by modulating the plurality of bits of the data at the transmitter; generating a first vector formed by the plurality of symbols at the transmitter; preparing, at the transmitter, a modified matrix by modifying an original matrix based on a number of rows of the first vector, the original matrix being predefined at the transmitter; generating a second vector by multiplying the first vector with the modified matrix at the transmitter; and transmitting, at the transmitter, symbols forming the second vector over communication channels established between the at least two transmitting antennas of the transmitter and the at least one receiving antenna of the receiver.

In a second exemplary embodiment, there is a method performed by a wireless communication device including at least two transmitting antennas for transmitting data. The method includes: transforming, at the wireless communication device, a plurality of bits of the data to be transmitted into a plurality of symbols by modulating the plurality of bits of the data; generating, at the wireless communication device, a first vector formed by the plurality of symbols; preparing, at the wireless communication device, a modified matrix by modifying an original matrix based on a number of rows of the first vector, the original matrix being predefined at the wireless communication device; generating, at the wireless communication device, a second vector by multiplying the first vector with the modified matrix; and transmitting symbols forming the second vector over communication channels established between the at least two transmitting antennas and at least one receiving antenna of a receiving apparatus.

In a third exemplary embodiment, there is a wireless communication device to transmit data by at least two transmitting antennas. This device includes: a modulating unit configured to transform a plurality of bits of the data to be transmitted into a plurality of symbols by modulating the plurality of bits of the data; a first vector generating unit configured to generate a first vector formed by the plurality of symbols; a modified matrix generating unit configured to generate a modified matrix by modifying an original matrix based on a number of rows of the first vector, the original matrix being predefined at the wireless communication device; a second vector generating unit configured to generate a second vector by multiplying the first vector with the modified matrix; and a transmitting unit configured to transmit symbols provided from the second vector over communication channels established between the at least two transmitting antennas and at least one receiving antenna of a receiving apparatus.

Indeed, a method according to the opening paragraph is characterized according to the invention in that it further includes a symbol spreading step in the course of which a tunable integer number K of successive symbols are to be spread over several time chips before being transmitted over said communication channels, said tunable number K being adjusted with respect to physical properties of the communication channels.

The invention enables to compound the spatial diversity obtained by the use of multiple communication channels established between the transmitting and receiving antennas with a diversity with respect to time of the data perceived by the receiving antennas. The choice, offered by virtue of the invention, of the value of the number K of successive symbols to be spread over several time chips enables a tuning of the communication throughput between the transmitter and the receiver.

According to an advantageous embodiment of the invention, the tunable integer number K of successive symbols to be spread over several time chips is dynamically adjusted by the transmitter on the basis of feedback information sent by the receiver and representative of the quality of communication conditions between said transmitter and receiver.

The feedback information may consist in a signal-to-noise ratio or in a signal-to-interference ratio computed in real time by the receiver, but it may also be formed by a value computed for the tunable integer number K by the receiver as a function of such signal-to-noise or signal-to-interference ratios.

According to a possible embodiment of the invention, the symbol spreading step is performed by computing a plurality of linear combinations of said K successive symbols, which linear combinations are intended to be transmitted by means of the transmitting antennas over a predetermined number of time chips.

The data transmitted over the multiple communication channels at any given moment will thus not be representative of a single symbol, as is the case in most known MIMO systems, but will represent a mixture between successive symbols, which thus introduces diversity with respect to time, a possible data redundancy intended to offset difficult communication conditions being provided by the adjustement of the tunable number K allowed by virtue of the invention.

According to a specific embodiment of the invention, the symbol spreading step is performed by multiplying a vector formed by a concatenation of said K successive symbols, on the one hand, with a predefined spreading matrix, on the other hand.

This specific embodiment of the invention is quite easy to implement, and thus enables to obtain an increased diversity at a relatively low cost in terms of computing resources and processing power required at the transmitting end, which is an important issue in the field of mobile communications where the transmitter may be constituted by a mobile terminal such as a mobile phone, which has to be as small as possible and will be power-fed by a battery having a limited energy storage capacity.

In case of a difference between the size of the vector formed by a concatenation of said K successive symbols, on the one hand, and a number of columns of the spreading matrix, on the other hand, i.e. when the tunable integer K is chosen such that data redundancy will actually be obtained, the vector formed by a concatenation of said K successive symbols may be completed with a number of nil components equal to said difference in order to perform the above described matrix multiplication.

Alternatively, one dimension of the spreading matrix may be reduced by suppressing a number of colums or raws equal to said difference in order to perform said multiplication.

The nature of the predefined spreading matrix may be chosen on the basis of prior knowledge of, or on the basis of assumptions pertaining to the communication channels to be established between the transmitting and receiving antennas.

According to a first variant of the specific embodiment described above, the spreading matrix is constructed in such a way that each of its rows is formed by successive chunks having each a size corresponding to the number of transmitting antennas, all chunks of any given row forming respective vectors having all a same norm.

A spreading matrix according to this first variant enables an essentially homogeneous distribution over time of energy carried by the symbols transmitted through ergodic communication channels and ensures optimal detectability of changes in the communication conditions from one time chip to another. This in turn enables to provide a high diversity with respect to time and space of the data as perceived by receiving antennas at the receiver end of such ergodic communication channels.

According to a second variant of the specific embodiment described above, the spreading matrix is constructed in such a way that each of its rows is formed by successive chunks having each a size corresponding to the number of transmitting antennas, all chunks of any given row forming respective vectors having all a same norm and being orthogonal to each other.

Thanks to the orthogonality between chunks, a spreading matrix according to this second variant enables to add ergodicity to essentially invariant channels, during the time and/or frequency interval needed for transmitting the linear combinations of the tunable integer number K of successive symbols, and additionnally provides an essentially homogeneous distribution over this time and/or frequency interval of the energy carried by the symbols transmitted through said communication channels, which ensures optimal detectability of changes in the communication conditions from one time chip to another. This in turn enables to provide a high diversity with respect to time and space of the data as perceived by receiving antennas at the receiver end of such essentially invariant communication channels.

According to a third variant of the specific embodiment described above, the spreading matrix is constructed in such a way that each of its rows is constituted by a plurality of segments forming respective vectors having all a same norm, each segment including successive chunks having each a size corresponding to the number of transmitting antennas, all chunks of any given segment forming respective vectors having all a same norm and being orthogonal to each other.

A spreading matrix according to this third variant is particularly well-suited to so-called block-fading communication channels, which are expected to feature C successive sets of communication conditions over the whole duration of the transmission of a predetermined number S of successive symbols, each set of communication conditions of said block-fading channels being thus essentially invariant during S/C time chips.

The orthogonality between all chunks of a same segment enables to add ergodicity to the block-fading channels during each invariance period defined by these S/C time chips, the equality of the norms of said chunks additionnally providing an essentially homogeneous distribution over each invariance period of the energy carried by the symbols transmitted during said invariance period through the block-fading channels. Since the communication conditions within such block-fading channels change from one invariance period to another, block-fading channels may be considered ergodic at the scale of the invariance periods, so that the additional equality of the norms of the segments of each row of the spreading matrix is sufficient to ensure an essentially homogeneous distribution over all successive invariance periods of the energy carried by the symbols transmitted through the block-fading channels. This in turn enables to provide a high diversity with respect to time and space of the data as perceived by receiving antennas at the receiver end of such block-fading communication channels.

According to a preferred embodiment of the above-described first, second or third variants, the spreading matrix will additionally have the properties of a rotation matrix, i.e. such a spreading matrix will be constituted by rows orthogonal to each other and having a same norm.

The use of a rotation matrix for computing the plurality of linear combinations of successive symbols at the transmitter end enables to optimize global performance of the iterative space-time decoder intended to process said symbols at the receiver end, by enhancing the performance of the first iterative step performed by said decoder.

According to one of its harware-related aspects, the invention also relates to a telecommunication system including at least one transmitter provided with at least two transmitting antennas and at least one receiver provided with at least one receiving antenna, which transmitter includes symbol encoding means for producing symbols to be transmitted over communication channels established between the transmitting and receiving antennas, system characterized in that said transmitter further includes symbol spreading means for spreading over several time chips a tunable integer number K of successive symbols before transmission of said symbols over said communication channels, said system further including tuning means for adjusting said tunable number K with respect to physical properties of the communication channels.

According to a possible embodiment of this harware-related aspect, the symbol spreading means are intended to compute a plurality of linear combinations of said K successive symbols, which linear combinations are intended to be transmitted by means of the transmitting antennas over a predetermined number of time chips.

According to a specific embodiment of the above-described harware-related aspect, the symbol spreading means are intended to multiply a vector formed by a concatenation of said K successive symbols, on the one hand, with a predefined spreading matrix, on the other hand.

According to another of its hardware-related aspects, the invention also relates to a communication device provided with at least two transmitting antennas and including symbol encoding means for producing symbols to be transmitted over said transmitting antennas, characterized in that it further includes symbol spreading means for spreading over several time chips a tunable integer number K of successive symbols before transmission of said symbols over said transmitting antennas.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION

Figure 1:
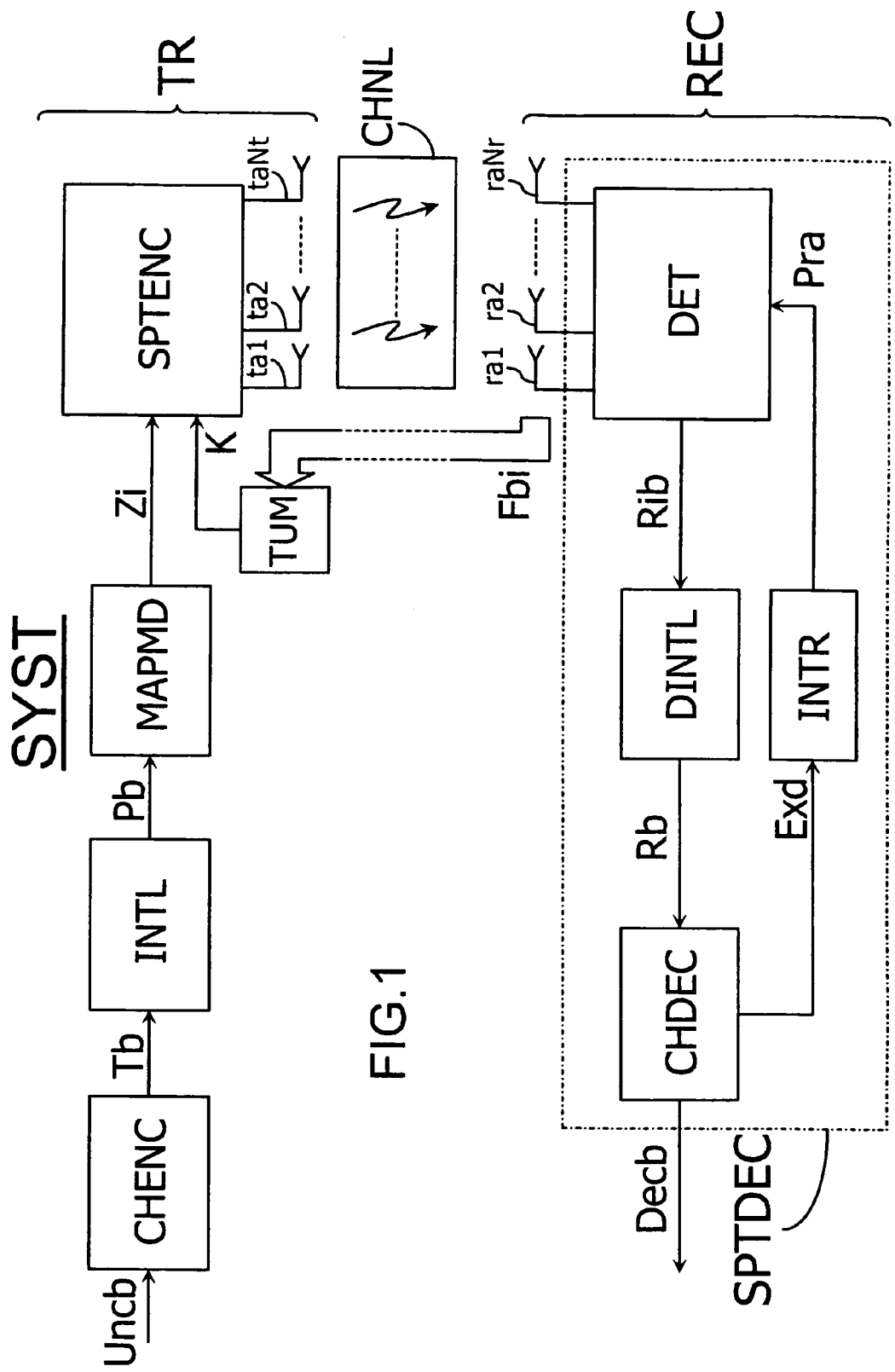
FIG. 1 is a block diagram showing a highly simplified MIMO telecommunication system.

FIG. 1 diagrammatically shows a telecommunication system including at least one transmitter TR and one receiver REC, intended to exchange signals through multiple communication channels CHNL established between Nt transmitting and Nr receiving antennas (ta1, ta2 ... taNt) and (ra1, ra2 ... raNr), respectively.

The transmitter TR shown in the example depicted here includes a channel encoder CHENC intended to apply an encoding, e.g. by means of a convolutional code or of a turbo code, to uncoded data bits Uncb, and to provide a binary stream Tb to be transmitted. The transmitter TR includes an interleaver INTL intended to generate permutated bits Pb, such an interleaving being useful for a later processing on the receiver side, since it will allow to obtain uncorrelated data. The permutated bits Pb are then divided into words of at least one bit each, which words are then mapped, i.e. transformed into a series of coded symbols $Z_i$ by a mapping and modulation module MAPMD. Successive symbols $Z_i$ are then fed to symbol encoding means essentially formed by a space-time encoder SPTENC, which performs a processing of said symbols $Z_i$ before their transmission.

In the known state of the art, the components of each symbol $Z_i$ are usually intended to be transmitted during a same time chip by respective transmitting antennas.

The receiver REC shown in the example depicted here includes a space-time decoder SPTDEC intended to produce decoded data bits Decb which should ultimately correspond to the originally uncoded data bits Uncb. This space-time decoder SPTDEC includes a space-time detector DET intended to process data carried by signals received by means of the receiving antennas (ra1, ra2 ... raNr), and to produce real or approximate likelihood values Rib related to estimates of the transmitted permutated bits Pb, which likelihood values are intended to be de-interleaved by a de-interleaver DINTL which is to output soft likelihood values Rb related to estimates of bits included in the binary stream Tb. A bit decoder included in the receiver REC, further referred to as channel decoder CHDEC, is intended to generate the decoded data bits Decb on the basis of said likelihood values Rb.

According to a loop structure commonly used in the art, the space-time detector DET will preferably make use of a priori information Pra generated in the course of previous decoding steps, and issued in the form of extrinsic information Exd by the channel decoder CHDEC through an interleaver INTR, which interleaver is identical to the interleaver INTL included in the transmitter TR.

The inventors have observed that increasing the diversity of the data perceived by the space-time detector DET enables said decoder to converge more quickly towards reliable estimates of the coded bits on the basis of which said data has been generated. The inventors have thus aimed at increasing the diversity of the data received by the receiving antennas (ra1, ra2 ... raNr), by compounding the spatial diversity obtained by the use of multiple communication channels CHNL established between the transmitting and receiving antennas (ta1, ta2 ... taNt) and (ra1, ra2 ... raNr) with a diversity with respect to time of the data as perceived by receiving antennas at the receiver end of said channels.

To this end, in accordance with the invention, the space-time encoder SPTENC is to spread over several time chips a tunable integer number K of successive symbols Zi before transmitting said symbols over communication channels CHNL, said tunable number K being adjusted with respect to physical properties of the communication channels CHNL.

The choice, offered by virtue of the invention, of the value of the number K of successive symbols Zi whose components are to be spread over several time chips enables a tuning of the communication throughput between the transmitter TR and the receiver REC.

In this embodiment of the invention, the value of the tunable integer number K of successive symbols Zi whose components are to be spread over several time chips is to be adjusted dynamically by tuning means TUM included in the transmitter, on the basis of feedback information Fbi sent by the receiver REC and representative of the quality of communication conditions between said transmitter TR and receiver REC.

Such feedback information Fbi may be combined with locally available information within the transmitter TR. The feedback information may for example define a maximum data throughput value with respect to the communication conditions, whereas locally available information may indicate that an even lower data throughput would be sufficient for the ongoing communication, which could enable to save transmitting resources and power.

The feedback information Fbi may consist in a signal-to-noise ratio or in a signal-to-interference ratio computed in real time by the receiver REC, but it may also be formed by a maximum value of K computed by the receiver REC itself as a function of such signal-to-noise or signal-to-interference ratios, in which case the tuning means TUM may only be tasked with forwarding said value K to the space-time encoder SPTENC.

Figure 2:
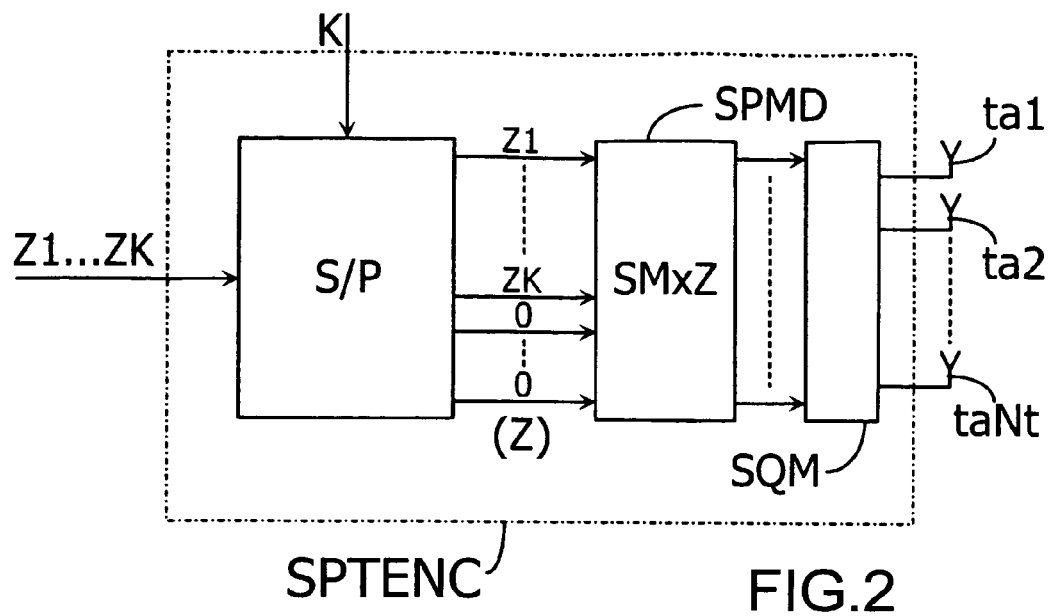
FIG. 2 is a block diagram showing a space-time encoder included in a transmitter included in a MIMO telecommunication system according to a first embodiment of the invention.

FIG. 2 diagrammatically shows a space-time encoder SPTENC according to a first embodiment of the invention. In the example depicted here, the space-time encoder SPTENC includes a series-to-parallel converter S/P intended to successively receive sets of K successive symbols Zi (for i=1 to K) and to deliver a vector formed by K concatenated successive symbols [Z1 ... ZK] to symbol spreading means SPMD, said vector being intended to be multiplied by a spreading matrix SM within the symbol spreading means SPMD.

In the example depicted here, a difference between the size of the vector formed by a concatenation of said K successive symbols [Z1 ... ZK], on the one hand, and a number of columns of the spreading matrix SM, on the other hand, enables to achieve data redundancy, the vector [Z1 ... ZK] formed by a concatenation of said K successive symbols being completed with a number of nil components equal to said difference in order to perform the above described matrix multiplication, which results in a vector Z shown and described hereinafter.

The symbol spreading means SPMD are in turn intended to compute Ns=S.Nt linear combinations of the components Zi (for i=1 to K) of the symbol vector Z, said linear combinations being intended to be sequenced into a predetermined number S of successive sets of Nt components by sequencing means SQM before being transmitted by the Nt transmitting antennas (ta1, ta2 ... taNt) over S time chips. The tunable number K may thus range from 1 to Ns.

The data transmitted at any given moment over the multiple communication channels established between said transmitting antennas (ta1, ta2 ... taNt) and the above-described receiving antennas will thus not be representative of a single symbol Zi (for i=1 to K), as is usually the case in known MIMO systems, but will represent a mixture between K successive symbols, which thus introduces optimal data diversity as perceived at the receiver end, with respect to ongoing communication conditions.

Figure 3:
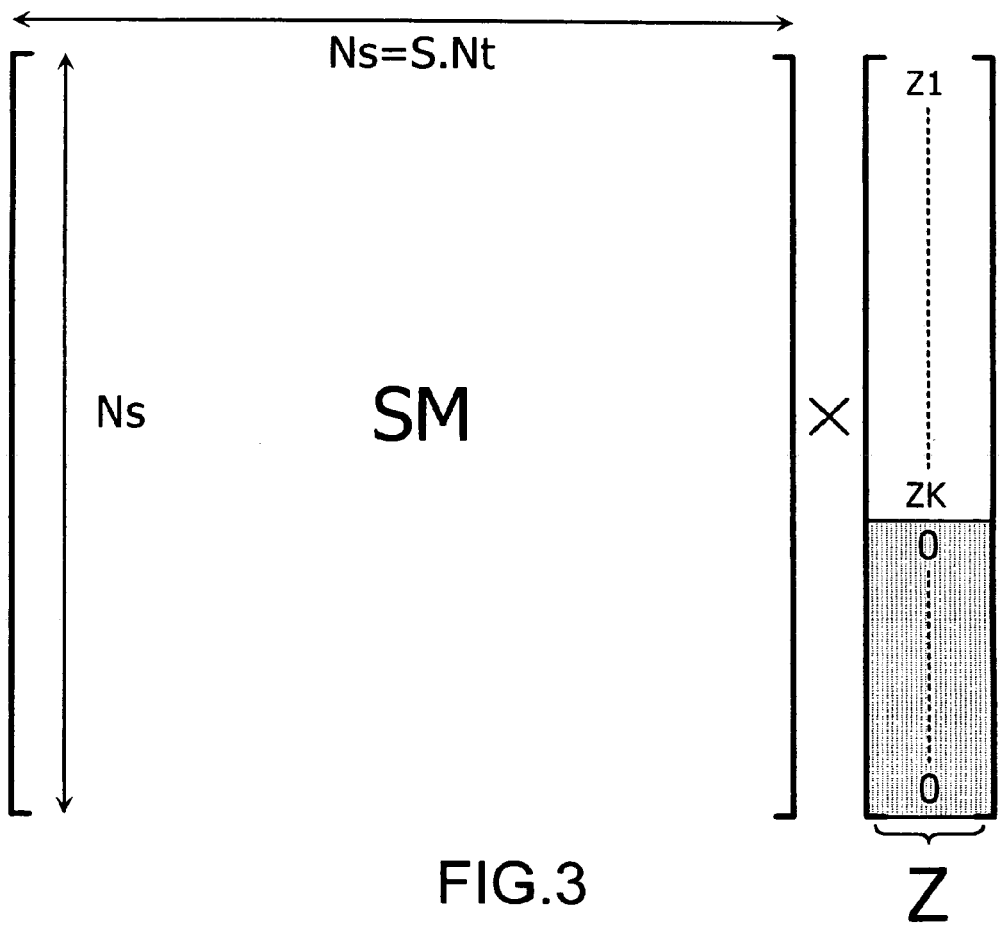
FIG. 3 is a diagram showing how a spreading step according to the invention may be performed within such a space-time encoder.

FIG. 3 depicts how linear combinations of the symbols Zi (for i=1 to K) may be computed by the above-described spreading means. According to this first embodiment of the invention, a vector Z is formed by a concatenation of said K successive symbols Zi with a suitable number of nil components. This vector Z is then multiplied with a predefined spreading matrix SM having, in this example, a size of NsxNs, where Ns=S.Nt, which enables to produce Ns separate linear combinations of all components Zi (for i=1 to K) of the symbol vector Z, which linear combinations are to be transmitted over Nt transmitting antennas during S successive time chips, whith a redundancy which will be all the more important as the difference between K and Ns will be important.

Figure 4:
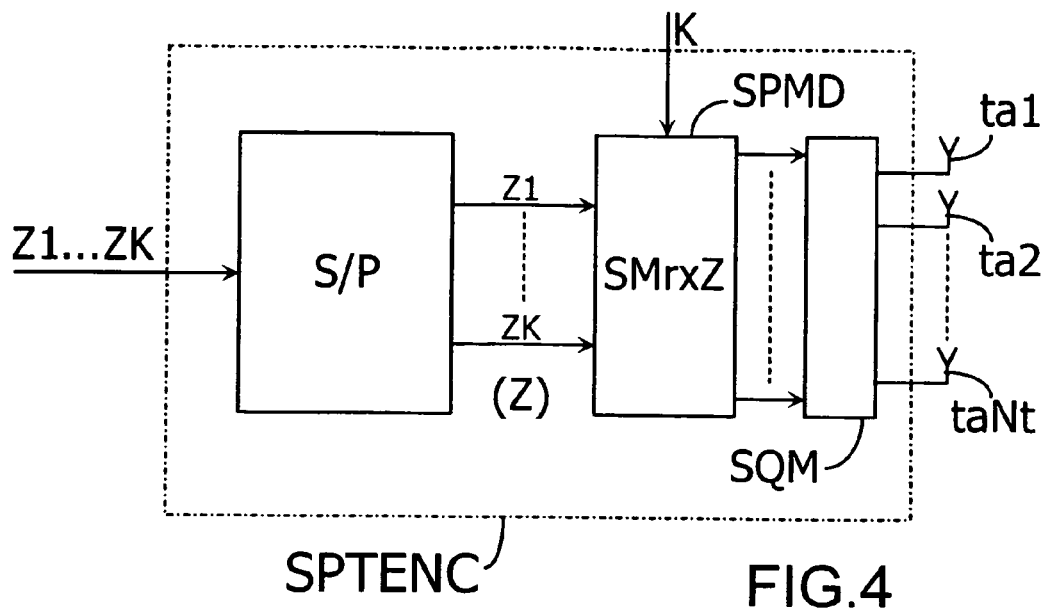
FIG. 4 is a block diagram showing a space-time encoder included in a transmitter included in a MIMO telecommunication system according to a second embodiment of the invention.

FIG. 4 diagrammatically shows a space-time encoder SPTENC according to a second embodiment of the invention. In the example depicted here, the space-time encoder SPTENC includes a series-to-parallel converter S/P intended to successively receive sets of K successive symbols Zi (for i=1 to K) and to deliver a vector Z formed by K concatenated successive symbols [Z1 ... ZK] to symbol spreading means SPMD, said vector Z being intended to be multiplied by a spreading matrix within the symbol spreading means SPMD.

In the example depicted here, a difference between the size of the vector Z formed by the concatenation of said K successive symbols [Z1 ... ZK], on the one hand, and a number of columns of an original spreading matrix, on the other hand, enables to achieve data redundancy but requires that one dimension of the original spreading matrix be reduced to K by suppressing a number of colums or raws equal to said difference, which results in a reduced spreading matrix SMr able to perform the above described matrix multiplication, as shown and described hereinafter.

The symbol spreading means SPMD will thus compute Ns=S.Nt linear combinations of the components [Z1 ... ZK] of the symbol vector Z, said linear combinations being intended to be sequenced into a predetermined number S of successive sets of Nt components by sequencing means SQM before being transmitted by the Nt transmitting antennas (ta1, ta2 ... taNt) over S time chips. The tunable number K may thus range from 1 to Ns.

The data transmitted at any given moment over the multiple communication channels established between said transmitting antennas (ta1, ta2 ... taNt) and the above-described receiving antennas will thus not be representative of a single symbol Zi (for i=1 to K), but will represent a mixture between K successive symbols [Z1 ... ZK], which thus introduces optimal data diversity as perceived at the receiver end, with respect to ongoing communication conditions.

Figure 5:
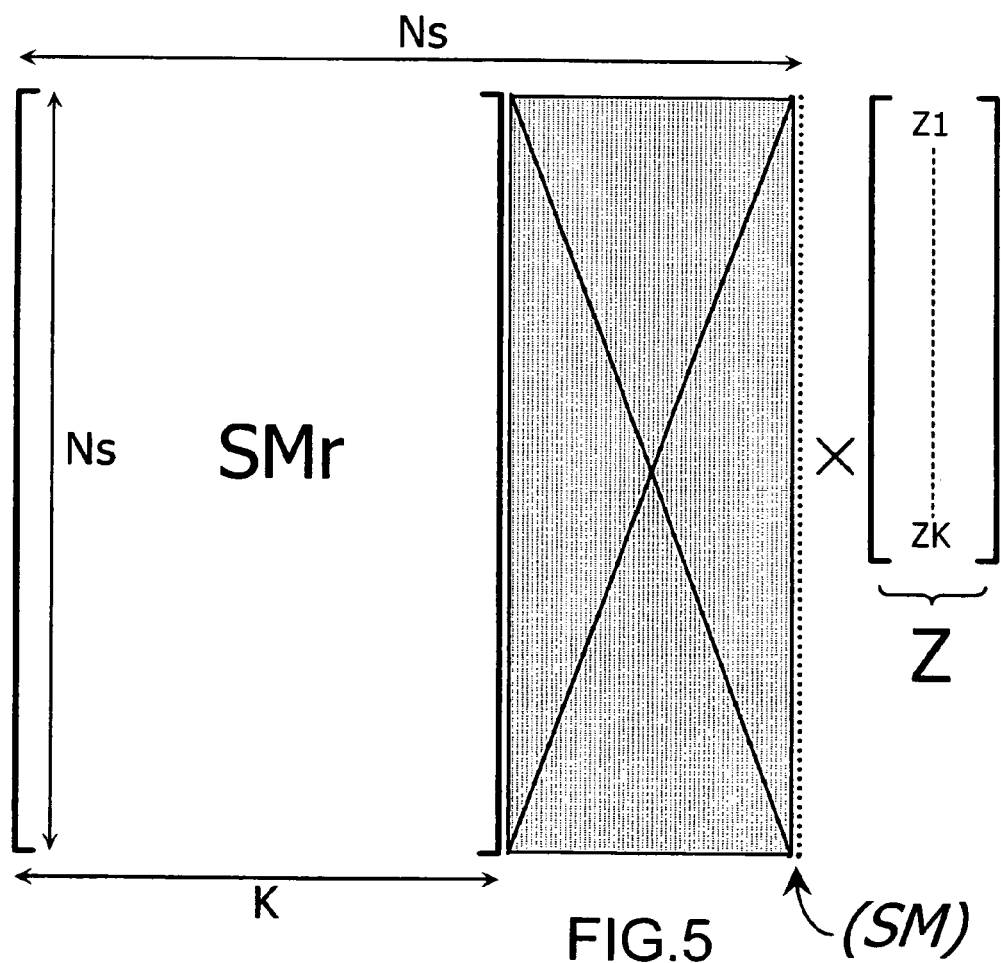
FIG. 5 is a diagram showing how a spreading step according to the invention may be performed within such a space-time encoder.

FIG. 5 depicts how linear combinations of the components [Z1 ... ZK] of the symbol vector Z may be computed by the above-described spreading means. According to this second embodiment of the invention, the vector Z is formed by a concatenation of K successive symbols Zi. This vector Z is then multiplied with a reduced spreading matrix SMr having, in this example, a size of Ns rows and K columns, which enables to produce Ns=S.Nt separate linear combinations of all components Zi (for i=1 to K) of the symbol vector Z, which linear combinations are to be transmitted over Nt transmitting antennas during S successive time chips, with a redundancy which will be all the more important as the difference between K and Ns will be important.

Though, in this example, a whole block of size Ns×(Ns−K) has been discarded from an original spreading matrix SM of size Ns×Ns, it should be noted that, in variants of this second embodiment of the invention, the (Ns−K) columns to be discarded could be selected individually. Furthermore, in other variants of the invention, the vector Z could be transposed before being multiplied by the reduced matrix SMr, in which case said reduced matrix SMr would be obtained by discarding (Ns−K) rows, instead of (Ns−K) columns as described hereinbefore, from an original spreading matrix SM.

The nature of the above-mentioned predefined spreading matrixes SM may be chosen on the basis of prior knowledge of, or on the basis of assumptions pertaining to the communication channels to be established between the transmitting and receiving antennas.

Figure 6:
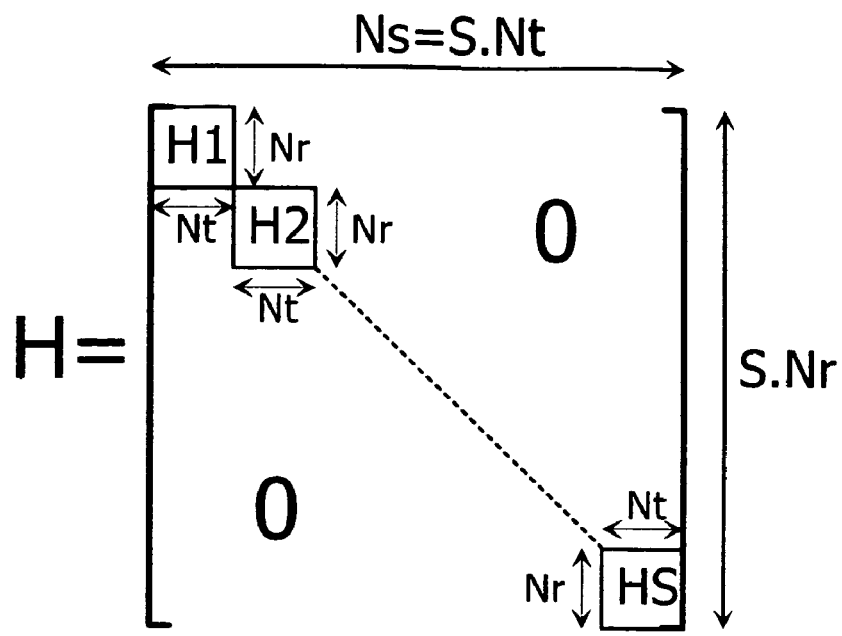
FIG. 6 is a diagram showing a channel matrix associated with ergodic communication channels.

FIG. 6 represents a channel matrix H depicting a situation in which the communication channels are supposed to be ergodic, i.e. the communication conditions within said channels are expected to change for each of the S time chips during which S successive sets of Nt linear combinations of the symbols Zi (for i=1 to K) are to be transmitted. This is modelized by S different diagonally arranged blocks H1 ... Hs, each of which having a size of Nr×Nt.

The inventors have found that a high diversity will be obtained if the quantity of data carried by such ergodic communication channels is essentially homogeneous over time. This enables to prevent situations in which a high amount of data is present at a given instant at the output of said communication channels, following which given instant almost no data will be present at said output, which would mean that time-related information will be easily detectable at said given instant and barely detectable afterwards. An essentially homogeneous distribution over time of the energy carried by the symbols transmitted through ergodic communication channels ensures optimal detectability of changes in the communication conditions from one time chip to another, and thus enables to provide a high data diversity with respect to time and space as perceived by receiving antennas at the receiver end of such communication channels.

Figure 7:
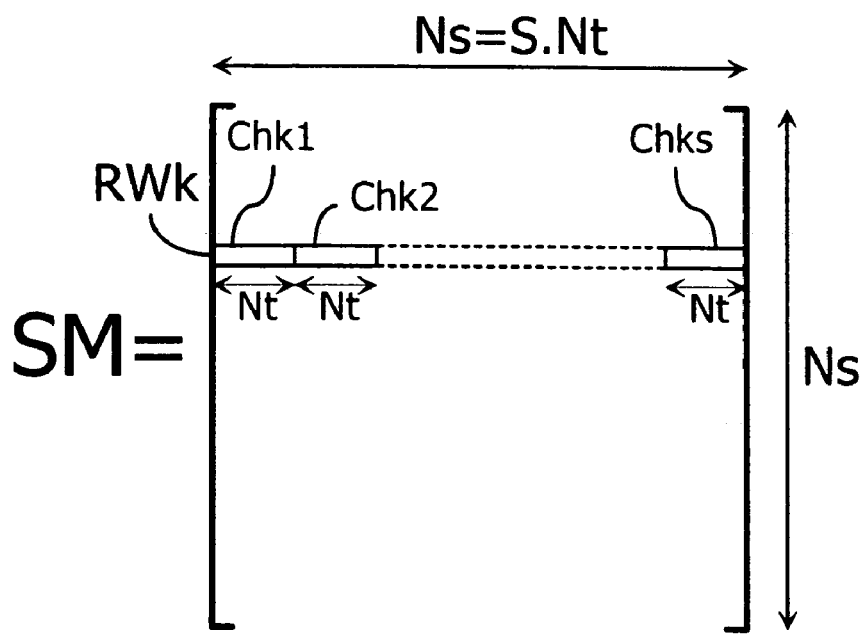
FIG. 7 is a diagram showing a spreading matrix adapted to such ergodic channels.

FIG. 7 depicts a spreading matrix SM according to a first variant of the above-described preferred embodiment of the invention, according to which said spreading matrix SM has a structure specifically adapted to ergodic communication channels. In this example, the spreading matrix SM is constructed in such a way that each of its rows RWk (for k=1 to Ns) is formed by S successive chunks Chk1 ... Chks having each a size corresponding to the number Nt of transmitting antennas, all chunks of any given row forming respective vectors having all a same norm, which enables to obtain the above-described homogeneous distribution of energy carried by the symbols transmitted through ergodic communication channels.

In situations almost opposite to the ergodic case described above, the communication channels may be essentially invariant, i.e. the communication conditions within said channels are expected to remain the same for all of the S time chips during which S successive sets of Nt linear combinations of the symbols Zi (for i=1 to K) are to be transmitted.

In such a case, no diversity with respect to time will be induced by the communication channels, which may be modelized within the channel matrix H by S identical diagonally arranged blocks in place of the S different blocks H1 ... Hs depicted in FIG. 6.

The inventors have found that a high time-related diversity as perceived by receiving antennas at the receiver end of such essentially invariant channels may be obtained by constructing the spreading matrix in such a way that each of its rows is formed by successive chunks having each a size corresponding to the number of transmitting antennas, all chunks of any given row forming respective vectors having all a same norm and being orthogonal to each other. A spreading matrix according to such a second variant of the above-described preferred embodiment of the invention may thus be represented as the matrix SM shown in FIG. 7, with the added condition that the chunks Chk1 ... Chks of any given row RWk are orthogonal with respect to each other. Such an orthogonality enables to simulate the effect ergodic communication channels would have on transmitted sets of linear combinations of successive symbols, and thus may be construed as performing an artificial transformation of essentially invariant channels into ergodic channels during the time interval needed for transmitting all linear combinations of said successive symbols. As explained hereinbefore, the fact that all chunks Chk1 ... Chks of any given row RWk have all a same norm enables to obtain a homogeneous distribution over time of the energy carried by the symbols transmitted through the artificially transformed communication channels.

A possible way of constructing such a spreading matrix consists in selecting, for each given row of this spreading matrix, a given square rotation matrix of dimensions Nt×Nt, with Nt greater than or equal to S, and selecting S rows of this rotation matrix for constituting the S successive chunks of said given row of the spreading matrix according to this second variant of the invention.

Figure 8:
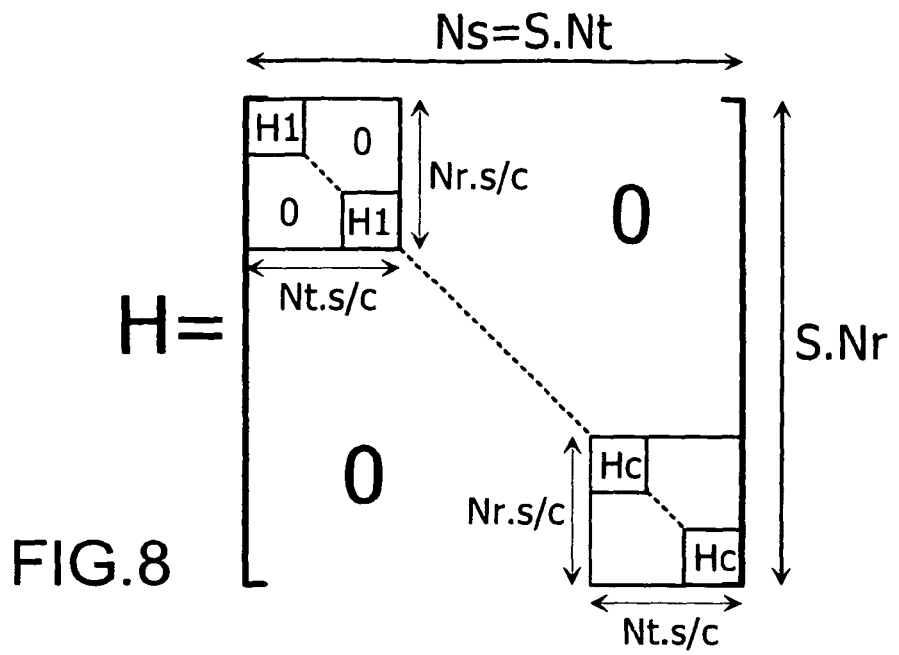
FIG. 8 is a diagram showing a channel matrix associated with block-fading communication channels.

FIG. 8 represents a channel matrix H depicting a situation in which the communication channels are supposed to be so-called block-fading channels, which are expected to feature C successive sets of communication conditions over the S time chips during which S successive sets of Nt linear combinations of the symbols Zi (for i=1 to K) to be transmitted, each set of communication conditions of said block-fading channels being, however, essentially invariant during S/C successive time chips forming an invariance period.

The channel matrix H includes in such a case C different diagonally arranged blocks, each being constituted by S/C identical diagonally arranged sub-blocks, respectively H1 . . . Hc, having each a size of Nr×Nt.

Figure 9:
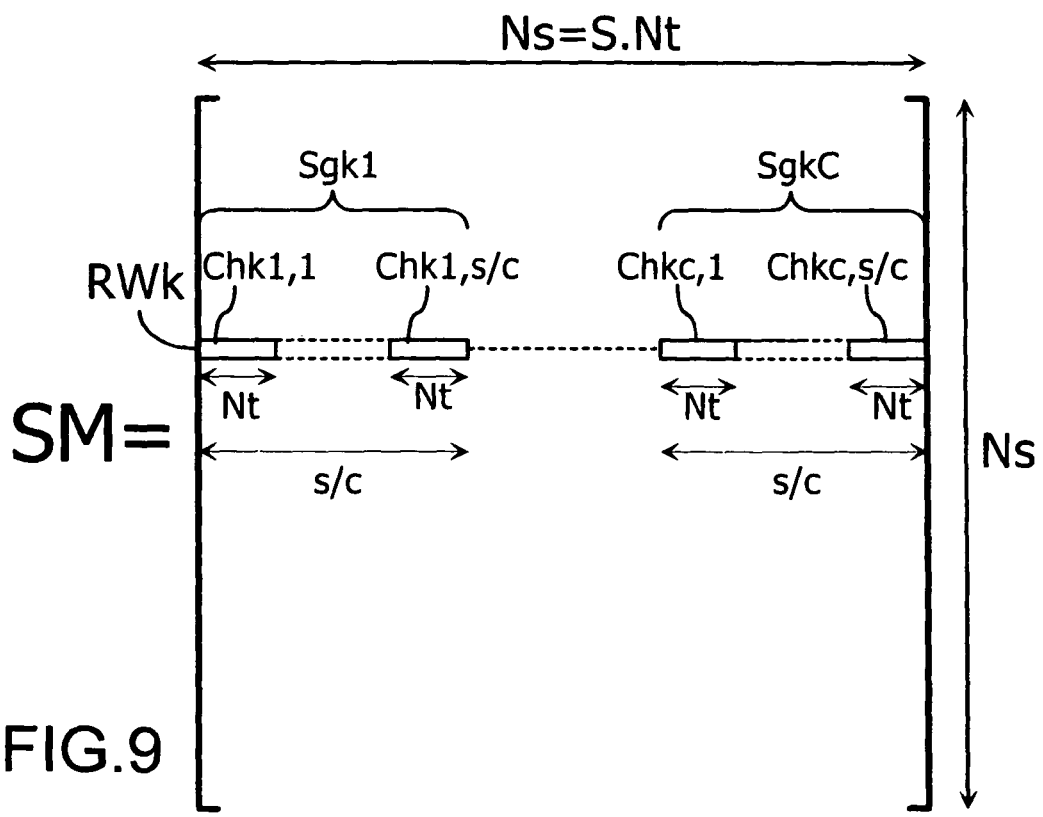
FIG. 9 is a diagram showing a spreading matrix adapted to such block-fading channels.

FIG. 9 shows a third variant of the above-described preferred embodiment of the invention, according to which the spreading matrix SM is constructed in such a way that each of its rows RWk (for k=1 to Ns) is constituted by C segments Sgkn (for n=1 to C) forming respective vectors having all a same norm, each segment Sgkn including successive chunks Chkn,1 . . . Chkn,s/c having each a size corresponding to the number of transmitting antennas, all chunks Chkn,1 . . . Chkn,s/c of any given segment forming respective vectors having all a same norm and being orthogonal to each other.

The orthogonality between all chunks Chkn,1 . . . Chkn,s/c of a same segment Sgkn enables to add ergodicity to the block-fading channels during each invariance period defined by the corresponding S/C time chips, the equality of the norms of said chunks Chkn,1 . . . Chkn,s/c additionnally providing an essentially homogeneous distribution, over each relevant invariance period, of the energy carried by the symbols transmitted through the block-fading channels during said invariance period. Since the communication conditions within block-fading channels change from one invariance period to another, said channels may be considered ergodic at the scale of the invariance periods, so that the additional equality of the norms of the C segments Sgkn (for n=1 to C) of each row RWk (for k=1 to Ns) of the spreading matrix SM is sufficient to ensure an essentially homogeneous energy distribution over the S time chips during which S successive sets of Nt linear combinations of the symbols Zi (for i=1 to K) are to be transmitted. This in turn enables to provide a high diversity with respect to time and space of the data as perceived by receiving antennas at the receiver end of such block-fading communication channels.

Figure 10:
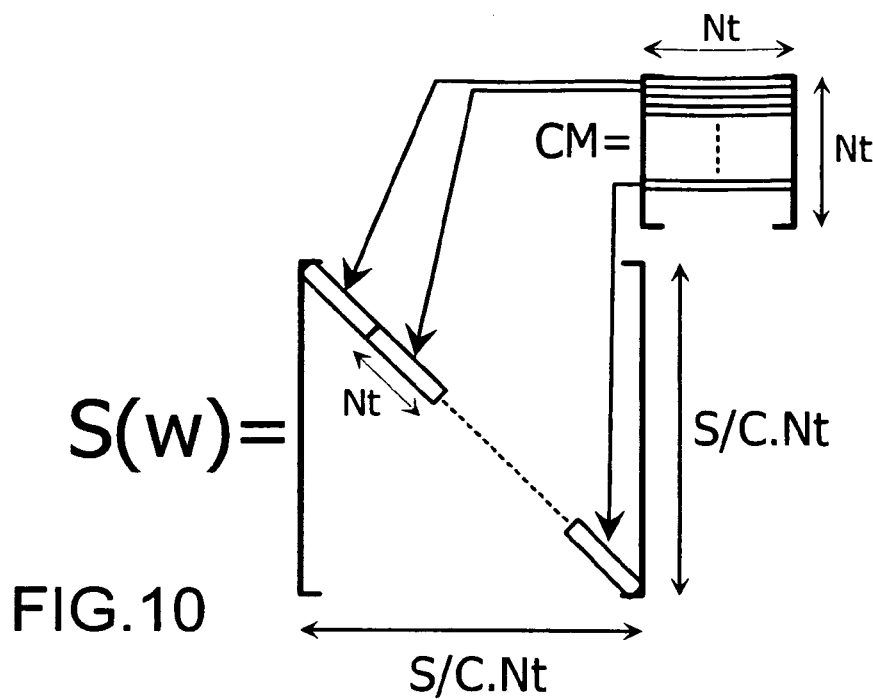
FIGS. 10 and 11 are diagrams showing how a spreading matrix adapted to block-fading communication channels may be constructed.
Figure 11:
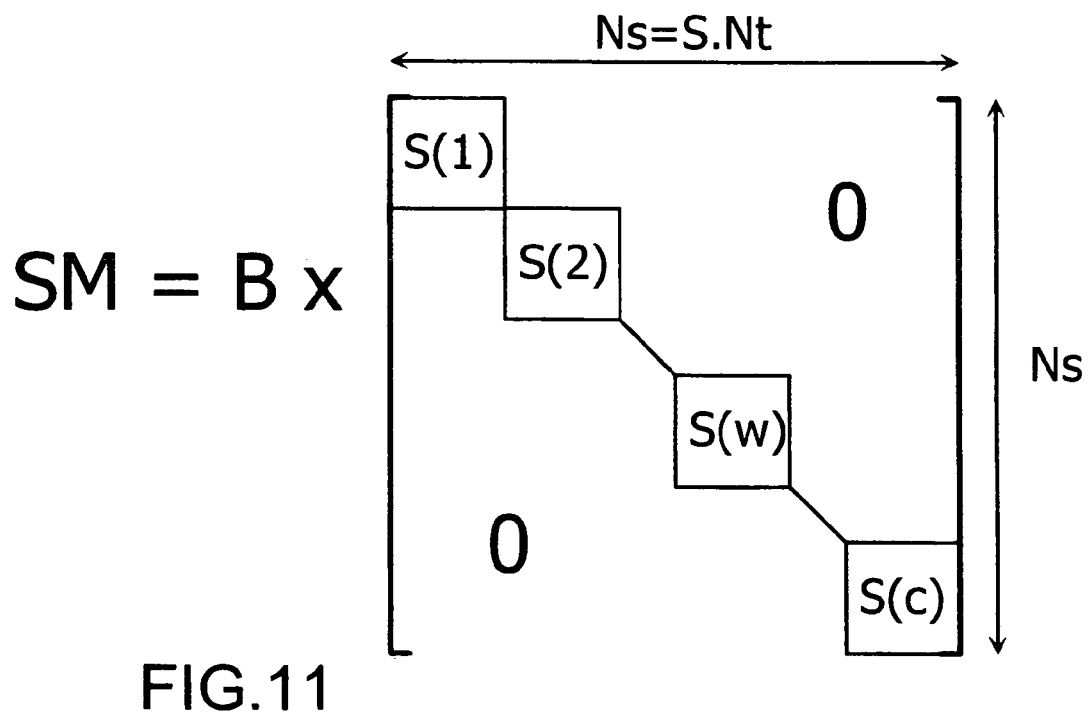

FIGS. 10 and 11 illustrate how a spreading matrix SM according to this third variant of the above-described preferred embodiment of the invention may be constructed.

In a first stage shown in FIG. 10, C sub-matrices S(w) (for w=1 to C) are constructed by selecting a square cyclotomic rotation matrix CM of dimensions Nt×Nt, with Nt greater than or equal to S/C, and selecting S/C rows of matrix CM for constituting S/C successive diagonal chunks of length Nt intended to form a diagonal of each sub-matrix S(W), all such diagonal chunks thus having a same norm and being orthogonal to each other.

Each component $CM_{m,l}$ of the cyclotomic matrix CM may be expressed as:

$$CM_{m,l} = \exp\left(2j\pi \cdot m \cdot \left(\frac{1}{\Phi^{-1}(2 \cdot Nt)} + \frac{l}{Nt}\right)\right),$$

where $\Phi$ represents an Euler function.

In a second stage shown in FIG. 11, the spreading matrix SM is then obtained by multiplying a matrix of dimension Ns×Ns formed by a diagonal array of such sub-matrices S(w) (for w=1 to C) with another cyclotomic rotation matrix B of dimensions Ns×Ns, whose components are given by:

$$B_{p,r} = \exp\left(2j\pi \cdot p \cdot \left(\frac{1}{\Phi^{-1}(2 \cdot Ns)} + \frac{r}{Ns}\right)\right).$$

A spreading matrix SM constructed as explained above will additionally have the properties of a rotation matrix, i.e. such a spreading matrix will be constituted by rows orthogonal to each other and having a same norm, which may be expressed as $SM \times SM^H = I$, where I is the identity matrix of rank Ns×Ns and $SM^H$ is a transposed conjugate of matrix SM.

The use of a rotation matrix for computing a plurality of linear combinations of successive symbols at the transmitter end enables to optimize global performance of the iterative space-time decoder intended to process said symbols at the receiver end, by enhancing the performance of the first iterative step performed by said decoder.

This performance optimization is, of course, also of interest in a non-iterative space-time decoder, in which only a single decoding step is performed, which single decoding step is equivalent to the first iterative step mentioned above.

The choice, offered by virtue of the invention, of the value of the number K of successive symbols to be spread over several time chips enables to dynamically adjust the communication throughput between the transmitter and the receiver to communication conditions evaluated in real-time.

The invention claimed is:

1. A method for transmitting data in a telecommunication system including at least one transmitter comprising at least two transmitting antennas and at least one receiver comprising at least one receiving antenna, the method comprising:
    transforming a plurality of bits of the data to be transmitted into a plurality of symbols by modulating the plurality of bits of the data at the transmitter;
    generating a first vector formed by the plurality of symbols at the transmitter;
    preparing, at the transmitter, a modified matrix by modifying an original matrix based on a number of rows of the first vector, the original matrix being predefined at the transmitter;
    generating a second vector by multiplying the first vector with the modified matrix at the transmitter; and
    transmitting, at the transmitter, symbols forming the second vector over communication channels established between the at least two transmitting antennas of the transmitter and the at least one receiving antenna of the receiver.

2. A method performed by a wireless communication device including at least two transmitting antennas for transmitting data, comprising:
    transforming, at the wireless communication device, a plurality of bits of the data to be transmitted into a plurality of symbols by modulating the plurality of bits of the data;
    generating, at the wireless communication device, a first vector formed by the plurality of symbols;
    preparing, at the wireless communication device, a modified matrix by modifying an original matrix based on a number of rows of the first vector, the original matrix being predefined at the wireless communication device;
    generating, at the wireless communication device, a second vector by multiplying the first vector with the modified matrix; and
    transmitting symbols forming the second vector over communication channels established between the at least two transmitting antennas and at least one receiving antenna of a receiving apparatus.

3. A wireless communication device to transmit data by at least two transmitting antennas, comprising:
- a modulating unit configured to transform a plurality of bits of the data to be transmitted into a plurality of symbols by modulating the plurality of bits of the data;
- a first vector generating unit configured to generate a first vector formed by the plurality of symbols;
- a modified matrix generating unit configured to generate a modified matrix by modifying an original matrix based on a number of rows of the first vector, the original matrix being predefined at the wireless communication device;
- a second vector generating unit configured to generate a second vector by multiplying the first vector with the modified matrix; and
- a transmitting unit configured to transmit symbols provided from the second vector over communication channels established between the at least two transmitting antennas and at least one receiving antenna of a receiving apparatus.

* * * * *